April 5, 1966  B. H. FANTOM  3,243,959
HYDRAULIC TRANSMISSION MECHANISM
Filed Nov. 13, 1964
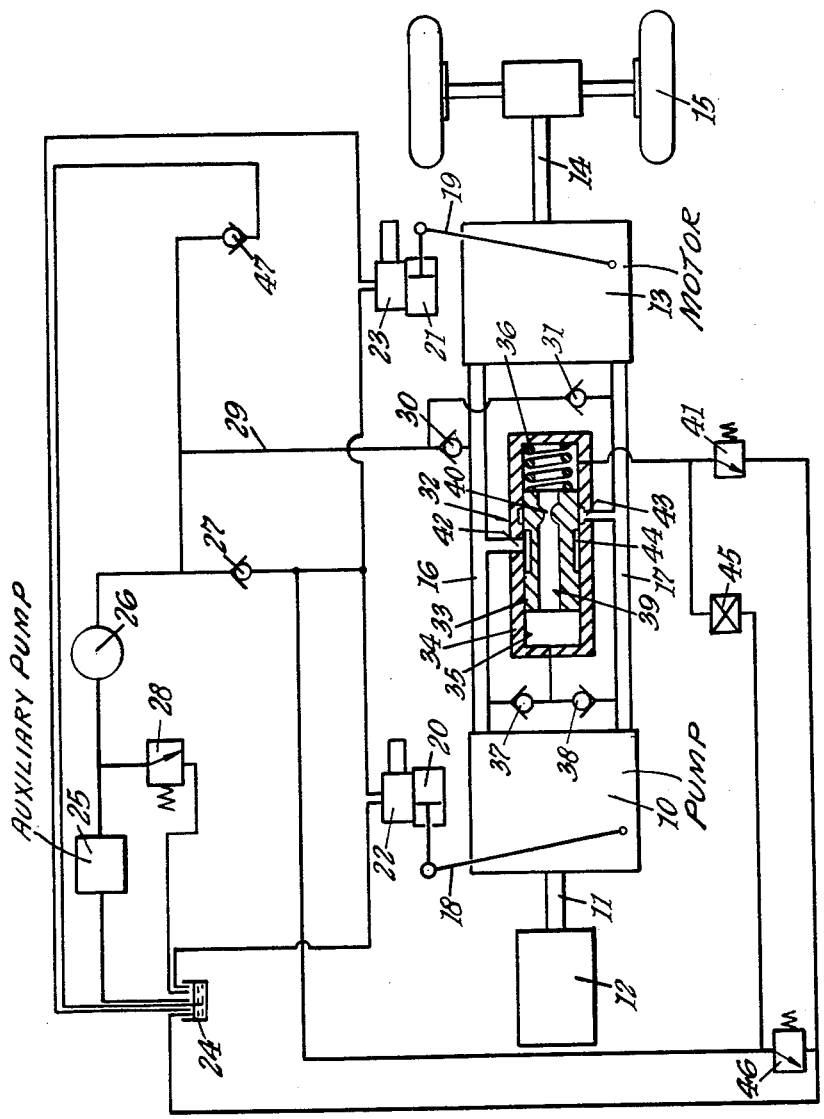

United States Patent Office 3,243,959
Patented Apr. 5, 1966

3,243,959
HYDRAULIC TRANSMISSION MECHANISM
Brian Henderson Fantom, Liverpool, England, assignor to Joseph Lucas (Industries) Limited, Birmingham, England
Filed Nov. 13, 1964, Ser. No. 410,848
4 Claims. (Cl. 60—53)

This invention relates to hydraulic transmission mechanisms for vehicles and of the kind comprising, in combination, a hydraulic motor adapted for connection to the road wheels of the vehicle, a variable stroke hydraulic pump arranged to be driven by the engine of the vehicle, a pair of conduits interconnecting the inlet of the pump with the outlet of the motor and the outlet of the pump with the inlet of the motor, a pair of fluid operable servo devices for controlling the stroke of the pump and motor respectively and a further engine driven pump for supplying fluid to the servo devices.

It is the usual practice with such a transmission mechanism to arrange that when the engine is stopped the stroke of the pump is substantially zero and that the stroke of the motor is at or near its maximum, with the result that if an attempt is made to start the engine of the vehicle, by towing the vehicle, the motor will act as a pump but will be unable to deliver motive fluid to the pump, to cause it to act as a motor, because the stroke thereof is zero thereby preventing it accepting any motive fluid. Moreover, since the further pump is engine driven, no fluid will be delivered to the servo devices thereby preventing them adjusting the stroke of the pump and motor.

The object of this invention is to provide such a transmission mechanism in a simple and convenient form which will enable the engine of the vehicle to be started by towing the vehicle.

According to the invention an hydraulic transmission system of the kind specified is characterized by the provision of valve means operable, when it is required to tow start the vehicle, to place the outlet of the motor in communication with the servo devices so that, when the vehicle is towed, fluid will be supplied to the servo devices by the motor thereby enabling said devices to vary the strokes of the pump and motor respectively.

The single view in the accompanying drawings shows a specific example of the invention in diagrammatic form.

In this example there is provided a vehicle hydraulic transmission mechanism including a variable stroke swash plate type pump 10 having an input shaft 11 which is adapted for connection to an engine 12 of the vehicle. Also provided is a variable stroke swash plate type motor 13 which has its output shaft 14 adapted for connection to the driving wheels 15 of the vehicle and which is supplied with motive fluid by the pump 10 through a first conduit 16 interconnecting the outlet of the pump with the inlet of the motor. A second conduit 17 interconnects the outlet of the motor with the inlet of the pump thereby completing the circuit for the motive fluid.

For controlling the position of the swash plates 18 and 19 of the pump and motor there is provided a pair of servo devices 20 and 21 respectively each of which comprises a fluid operable piston mounted in a cylinder and fluid can be admitted to the ends of the cylinders under the control of driver operable control means 22 and 23 respectively which are movable to control the speed ratio between the engine 12 and the driving wheels 15. Normally when there is no fluid pressure in the servo devices 20 and 21, and when the engine 12 is stopped, the stroke of the pump 10 is substantially zero and the stroke of the motor 13 is at or near its maximum. Fluid is supplied to the servo devices 20 and 21 from a fluid reservoir 24 by a further engine driven pump 25 through a filter 26 and a first non-return valve 27 which prevents return flow to the pump 25 from the servo devices. The output pressure of the pump 25 is controlled by a first pressure relief valve 28 connected between the outlet of the pump 25 and the first non-return valve 27 and there is also provided, from the outlet of the further pump 25, a passage 29 through which fluid is delivered to the first and second conduits 16 and 17 through second and third non-return valves 30 and 31 respectively which are arranged to allow flow from the pump 25 to the conduits 16 and 17 respectively.

Such a transmission mechanism as described operates in known manner so that, as the driver operable means 22 and 23 are simultaneously operated, when the engine is running, the pump 10 will deliver motive fluid to the motor 13, which will in turn drive the wheels 15 of the vehicle. The further pump 25, apart from supplying fluid for the servo devices 20 and 21 supplies make up fluid to conduits 16 and 17 so that losses of fluid, due to leakage, are made up.

Also provided in the system is a main high pressure relief valve 32 which can connect the first and second conduits 16 and 17 together so that, should there be an excessive fluid pressure in one of the conduits owing to the vehicle encountering an obstacle, fluid will be spilled to the other conduit thereby preventing damage to the mechanism. This main high pressure relief valve 32 comprises a cylindrical valve member 33 which is slidably mounted in a body 34 providing a cylindrical chamber 35. Between one end of the chamber 35 and the adjacent end of the valve member 33 is mounted a spring 36. The other end of the chamber 35 is in communication, through fourth and fifth non-return valves 37 and 38 respectively, with the first and second conduits 16 and 17 and formed in the valve member 33 is an axial passage 39 which contains a restricted orifice 40. The end of the chamber 35 containing the spring 36 is in communication with a second pressure relief valve 41 and the arrangement is such that normally, the pressure in the ends of the chamber 35 are equal so that the position of the valve member 33 is controlled by the spring. However, when the second pressure relief valve 41 opens, due to an excessive pressure in one of the conduits 16 and 17 a pressure drop occurs across the orifice 40 and the valve member 33 moves against the action of the spring 36. Formed in the wall of the chamber 35 are a pair of axially spaced ports 42 and 43 which are in communication with the conduits 16 and 17 respectively and formed in the valve member 33 is a peripheral groove 44, so positioned that when the valve member 33 moves against the action of the spring 36, the ports 42 and 43 will be placed in communication with each other thereby allowing the excessive pressure in one of the conduits to be relieved to the other conduit.

In applying the invention to such a transmission mechanism there is provided a driver operable stop valve 45 which is arranged, when opened, to place the end of the chamber 35 containing the spring 36 in communication with the servo devices 20 and 21.

When it is required to tow start a vehicle having a transmission mechanism as above described, the driver opens the stop valve 45 and moves the control means 22 and 23 to positions in which, when fluid is delivered to the servo devices 20 and 21, the swash plates 18, 19 will be moved to positions to provide a speed ratio between the engine 12 and wheels 15 suitable for tow starting. As the vehicle is towed, the motor 13 acts as a pump and fluid will be delivered to the second conduit 17 and will flow through the fifth non-return valve 38, the end of the chamber 35 remote from the spring 36, the axial passage 39 in the valve member 33, and the stop valve 45 to the servo devices 20 and 21 thereby allowing them to move the swash plates 18 and 19 of the pump 10 and motor 13 to the respective correct positions. The first non-return valve 27 prevents fluid delivered through the stop valve 45 flowing to the further pump 25 and a third pressure relief valve 46 is provided between the stop valve 45 and the servo devices 20 and 21 to prevent an excessive pressure being applied to the servo devices. Furthermore this pressure relief valve 46 is set to open at a slightly higher pressure than the first pressure relief valve 28 so that it only operates when the stop valve 45 is opened. During the initial rotation of the motor 13 during towing, the main relief valve 32 will open to interconnect the conduits 16 and 17 but the small flow required to pressurize the servo devices 20 and 21 will still occur. This small flow represents a leakage from the conduits 16 and 17 and this is made up by drawing fluid from the reservoir 24 through a sixth non-return valve 47.

When the servo devices 20 and 21 move the swash plates 18 and 19 to the positions determined by the control means 22 and 23, the stop valve 45 can be closed so that the valve member 33 will move under the action of its spring 36 to allow all the fluid delivered by the motor 13 to be passed to the pump 10, which in turn will drive the engine 12. When the engine starts, the transmission mechanism will then operate in its intended manner by means of the control means.

Having thus described my invention what I claim as new and desire to secure by Letters Patent is:

1. A vehicle hydraulic transmission system comprising a road wheel driving hydraulic swash-plate type motor, a variable stroke engine driven hydraulic swash-plate type pump, a pair of conduits respectively interconnecting an inlet of the pump with an outlet of the motor, and an outlet of the pump with an inlet of the motor, a fluid operable servo device connected to the pump for controlling the stroke thereof, a further engine driven pump for supplying fluid to the servo device, and a driver operable valve means connected in a conduit between the output of the motor and the servo device.

2. A vehicle hydraulic transmission system as claimed in claim 1 in which a pressure relief valve is provided in the conduit between the output of the motor and the servo device, between the output of the motor and said valve means.

3. A vehicle hydraulic transmission system as claimed in claim 1 in which there is a non-return valve in a conduit between the servo device and the further pump.

4. A vehicle hydraulic transmission system comprising a road wheel driving variable stroke hydraulic swash plate type motor, a variable stroke engine driven hydraulic swash plate type pump, a pair of conduits respectively interconnecting an inlet of the pump with an outlet of the motor, and an outlet of the pump with an outlet of the motor, a pair of fluid operable servo devices connected to the pump and motor respectively for controlling the strokes thereof, a further engine driven pump for supplying fluid to the servo devices, and a driver operable valve means connected in a conduit between the output of the motor and the servo devices.

References Cited by the Examiner
UNITED STATES PATENTS 2,886,944  5/1959  Horwood _____ 60—53
3,117,420  1/1964  Young _____ 60—53

EDGAR W. GEOGHEGAN, *Primary Examiner.*